United States Patent [19]

Suzuki

[11] Patent Number: 4,848,858

[45] Date of Patent: Jul. 18, 1989

[54] MOBILE STAND-TYPE LOUDSPEAKER SET INSTALLING DEVICE

[75] Inventor: Takashi Suzuki, Yamagata, Japan

[73] Assignee: Pioneer Electronic Corporation, Tokyo, Japan

[21] Appl. No.: 153,899

[22] Filed: Feb. 9, 1988

[30] Foreign Application Priority Data

Feb. 9, 1987 [JP] Japan .............................. 62-17533[U]

[51] Int. Cl.[4] .................................................. A47B 67/02
[52] U.S. Cl. ..................................... 312/246; 312/7.1; 248/298
[58] Field of Search ................ 312/7.1, 245, 247, 246; 248/506, 503, 298, 295.1

[56] References Cited

U.S. PATENT DOCUMENTS

| | | | |
|---|---|---|---|
| 1,632,036 | 6/1927 | Mullen | 248/295 X |
| 3,634,983 | 1/1970 | Welch | 312/245 |
| 3,827,772 | 8/1974 | Johnson | 312/7.1 |
| 4,033,424 | 7/1977 | Evans | 248/503 |
| 4,592,530 | 6/1986 | Seely et al. | 248/298 |
| 4,653,818 | 3/1987 | DeBruyn | 312/246 |

Primary Examiner—Joseph Falk
Attorney, Agent, or Firm—Sughrue, Mion, Zinn, Macpeak & Seas

[57] ABSTRACT

A mobile stand-type loudspeaker set installing device including a movable mounting member slidably mounted on the bottom of a cabinet accommodating a loudspeaker, and a long mounting screw threadably engaged with the movable mounting member. With this device, it is never necessary to drill a mounting hole in a steel plate body member of the vehicle, and hence the loudspeaker set can be readily installed on the vehicle body.

4 Claims, 2 Drawing Sheets

MOBILE STAND-TYPE LOUDSPEAKER SET INSTALLING DEVICE

BACKGROUND OF THE INVENTION

The present invention relates to a device for installing a mobile stand-type loudspeaker set.

FIGS. 1A and 1B illustrate a conventional method of installing a mobile stand-type loudspeaker set. In accordance with the conventional method, as shown in FIG. 1A, first a mounting hole 2 is formed in the bottom of the cabinet 1 of the loudspeaker set, and a mounting bolt 3 is fixedly fitted in the mounting hole 2 thus formed. Then, as shown in FIG. 1A, a mounting hole is formed in the rear deck 4 of the automobile, and the loudspeaker set is placed on the rear deck 4 with the mounting bolt 3 inserted into the mounting hole formed in the rear deck 4. Thereafter, the mounting bolt 3 is pushed downwardly and held with a mounting plate and a nut 5 inside the trunk so that the rear deck 4 and a steel supporting plate 6 of the automobile body are held between the bottom of the cabinet 1 and the nut screwed on the mounting bolt.

In FIG. 1B, reference numeral 7 designates the rear windshield, and 8, the rear seat.

In the above-described conventional method, in mounting the cabinet 1 accommodating a loudspeaker on the rear deck 4, the mounting position of the loudspeaker is determined substantially by the distance between the cabinet and the rear windshield and the width of the rear deck 4. Accordingly, the position of the mounting bolt 3 is also determined. With this arrangement, however, sometimes it is necessary to form a hole in the steel plate 6 of the automobile body to insert the mounting bolt.

SUMMARY OF THE INVENTION

An object of the invention is to eliminate the above-described difficulties accompanying a conventional method of installing a mobile stand-type loudspeaker set.

More specifically, an object of the invention is to provide a device for installing a mobile stand-type loudspeaker set in which, even when the mounting position of the loudspeaker set is limited, the mounting bolt can be moved so that the loudspeaker set can be readily installed without having to drill into the steel plate of the automobile body.

The foregoing object and other objects of the invention have been achieved by the provision of a device for installing a stand-type loudspeaker set on an automobile body which, according to the invention, comprises: a base arm secured to the bottom of the cabinet in which a loudspeaker is fixedly provided, a movable mmounting member engaged with the base arm in such a manner as to be movable along the base arm, and a long mounting screw threadably engaged with the movable mounting member.

The nature, principle and utility of the invention will become more apparent from the following detailed description when read in conjunction with the accompanying drawings.

DESCRIPTION OF THE PREFERRED EMBODIMENTS

An example of a mobile stand-type loudspeaker set installing device according to the invention will be described with reference to the accompanying drawings.

Figure 1A:
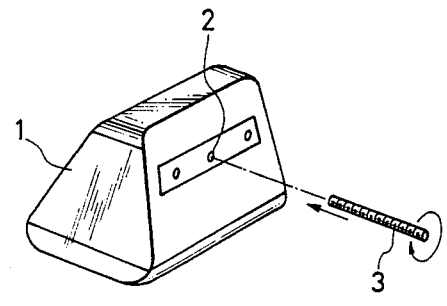
FIGS. 1A and 1B are explanatory diagrams used for a description of a conventional mobile stand-type loudspeaker installing method.
Figure 1B:
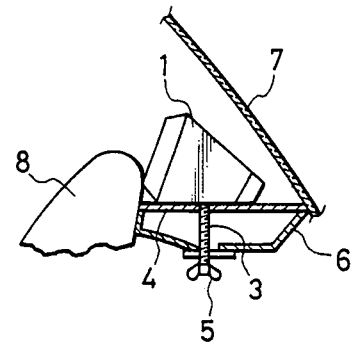
Figure 2:
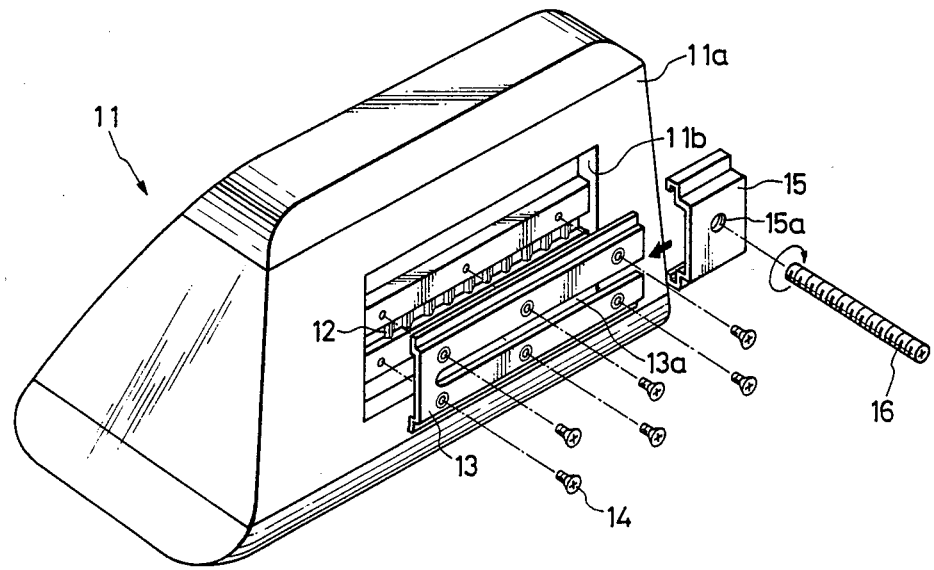
FIG. 2 is an exploded perspective view showing an example of mobile stand-type loudspeaker set installing device according to the invention.

As shown in FIG. 2, a recess 11b is formed in the bottom 11a of a cabinet 11 in which a loudspeaker is fixedly provided. A number of positioning ribs 12 are arranged in a line at predetermined intervals in the recess 11b. A base arm 13 is fixedly provided behind the positioning ribs 12 with a plurality of screws 14.

The base arm 13 is substantially in the form of an elongated plate which is substantially dish-shaped in section and has a substantially U-shaped groove 13 extending along the central longitudinal axis.

A movable mounting member 15 is mounted on the base arm 13 in such a manner that it is slidable in the longitudinal direction (right and left) of the base arm 13. The movable mounting member 15 has a threaded hole 15a at the center and a long mounting screw 16 is engaged with the threaded hole 15a.

A method of intalling the loudspeaker set using the device of the invention will be described.

The movable mounting member 15 is engaged with the base arm 13. Then, the base arm 13 is secured to the recess 11b of the cabinet 11 with the arm fixing screws so that the movable mounting member cannot be removed from the bottom 11a of the cabinet 11.

Figure 3:
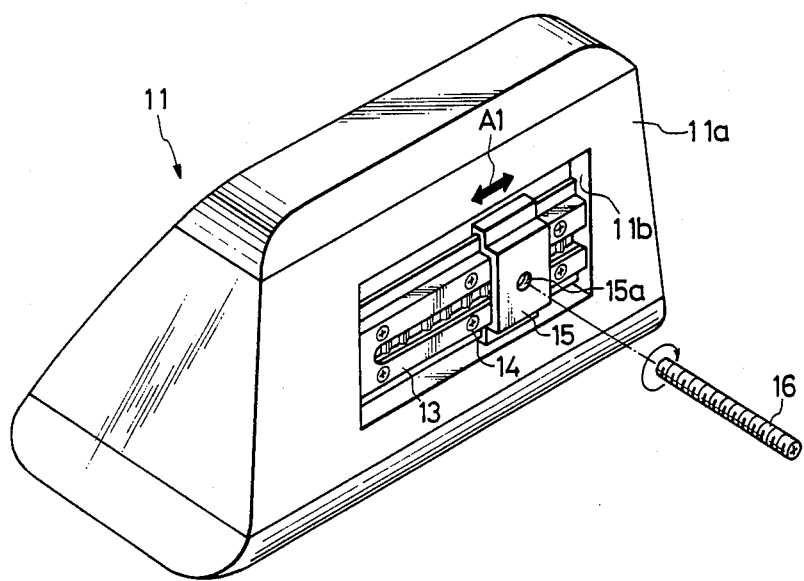
FIG. 3 is a perspective view showing the movement of a movable mounting member in the device of FIG. 1.

As described above, depending on the distance between the cabinet and the rear windshield or the width of the rear deck, the installation position of the cabinet 11 may be limited. However, with the method of the invention, unlike the conventional method, the loudspeaker set can be installed on the rear deck without having to drill a hole in any steel body member of the vehicle body because the movable mounting member 15 can be moved along the base arm 13, as indicated by an arrow A1 in FIG. 3.

With the long mounting scfrew 16 screwed halfway into the threaded hole 15a, the movable mounting member 15 can be moved right and left. However, when the long mounting screw 16 is fully screwed into the threaded hole 15a, right and left movement of the movable mounting member 15 is inhibited by the positioning ribs 12 provided in the recess 11b formed in the bottom 11a of the cabinet 11; that is, the movable mounting member 15 is completely fixed. This makes it possible to install the loudspeaker set on the rear deck without having to drill the steel plate of the vehicle body.

As described above, in the mobile stand-type loudspeaker installing device of the invention, the movable mounting member is slidably mounted on the base arm which is secured to the bottom of the cabinet, and the long mounting screw is threadably engaged with the movable mounting member so that the mounting long screw can be slid right and left together with the movable mounting member. Therefore, with the device of the invention, it is unnecessary to drill any steel plate of the vehicle body in the installation of the loudspeaker set on the rear deck.

What is claimed is:

1. A device for installing a stand-type loudspeaker cabinet to a vehicle body, comprising:
   an elongate base arm secured to the bottom of said cabinet and having engagement projections extending longitudinally thereof;
   a movable mounting member having substantially U-shaped engaging portions slideably engaged with said engagement projections of said base arm in such a manner as to be movable in the longitudinal direction along said base arm, said mounting member having a threaded opening therein; and
   a threaded mounting screw threadedly engaged in said threaded opening of said movable mounting member, one end of said screw extending through said mounting member and engaging said base arm so as to fixedly secure said mounting member thereto and another threaded end of said screw extending away from said base arm such that said another end of said mounting screw provides a means for securing said cabinet to the vehicle body.

2. The installing device of claim 1, wherein said base arm has the form of a dish-shaped plate in cross section and has a substantially U-shaped groove extending along a central longitudinal axis thereof for allowing the slideable movement of said mounting member having said screw engaged therewith.

3. The installing device of claim 2, wherein said base arm is recessed in said bottom of said cabinet.

4. The installing device of claim 3, further comprising a plurality of positioning ribs arranged in a line at predetermined intervals on said recess for receiving said one end of said screw.

* * * * *